US011863371B2

(12) United States Patent
Kataoka et al.

(10) Patent No.: US 11,863,371 B2
(45) Date of Patent: Jan. 2, 2024

(54) IOT DEVICE MANAGEMENT APPARATUS, IOT DEVICE MANAGEMENT METHOD, AND PROGRAM

(71) Applicant: Nippon Telegraph and Telephone Corporation, Tokyo (JP)

(72) Inventors: Misao Kataoka, Musashino (JP); Hirofumi Noguchi, Musashino (JP); Takayuki Akiyama, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 79 days.

(21) Appl. No.: 17/630,255

(22) PCT Filed: Aug. 5, 2019

(86) PCT No.: PCT/JP2019/030684
§ 371 (c)(1),
(2) Date: Jan. 26, 2022

(87) PCT Pub. No.: WO2021/024348
PCT Pub. Date: Feb. 11, 2021

(65) Prior Publication Data
US 2022/0294687 A1    Sep. 15, 2022

(51) Int. Cl.
*H04L 41/0663* (2022.01)
*G06F 9/455* (2018.01)
(Continued)

(52) U.S. Cl.
CPC ...... *H04L 41/0663* (2013.01); *G06F 9/45558* (2013.01); *H04L 41/12* (2013.01); *H04L 41/14* (2013.01); *G06F 2009/45595* (2013.01)

(58) Field of Classification Search
CPC ..... H04L 41/0663; H04L 41/12; H04L 41/14; G06F 9/45558; G06F 2009/45595
See application file for complete search history.

(56) References Cited

U.S. PATENT DOCUMENTS 9,998,926 B1 *  6/2018  Gale ................... H04L 67/12
10,015,353 B1 *  7/2018  Perez .................. H04L 69/161
(Continued)

FOREIGN PATENT DOCUMENTS

JP        2013182553        9/2013

OTHER PUBLICATIONS

Wen et al., "Fog Orchestration for Internet of Things Servivces", IEEE Internet Computing, vol. 21, Issue 2, Mar. 2017, IEEE Publishing.*
(Continued)

*Primary Examiner* — Todd L Barker
(74) *Attorney, Agent, or Firm* — Fish & Richardson P.C.

(57) ABSTRACT

An IoT device management apparatus includes: a locality calculating unit which receives a result of predetermined processing having been performed with respect to acquired information from cameras as IoT devices by applications associated with computes so as to constitute a virtual machine and which, by determining a locality indicating a closeness of arrangement positions of the plurality of cameras to be high when a degree of coincidence among pieces of acquired information from the cameras representing received results is high, calculates locality information that is a result of the determination; and an application generation recovery control unit which extracts a pair of cameras with a high locality from the locality information and which performs control for associating applications related to the extracted pair of cameras with different computes.

12 Claims, 12 Drawing Sheets

(51) Int. Cl.
    *H04L 41/12*          (2022.01)
    *H04L 41/14*          (2022.01)

(56) References Cited

U.S. PATENT DOCUMENTS

| | | | |
|---|---|---|---|
| 10,373,179 B2* | 8/2019 | Greenberger | H04W 4/02 |
| 10,419,469 B1* | 9/2019 | Singh | H04L 67/535 |
| 10,510,158 B1* | 12/2019 | Kamon | G06T 7/73 |
| 10,873,592 B1* | 12/2020 | Singh | G06F 11/3476 |
| 2019/0098118 A1* | 3/2019 | Utama | H04L 61/4511 |
| 2019/0373472 A1* | 12/2019 | Smith | H04W 12/108 |
| 2020/0064446 A1* | 2/2020 | Chan | H04B 17/318 |
| 2020/0374292 A1* | 11/2020 | Rakshit | H04L 63/1433 |
| 2020/0393909 A1* | 12/2020 | Parland | G06V 40/20 |
| 2021/0382882 A1* | 12/2021 | Mogre | G06F 16/245 |
| 2022/0200869 A1* | 6/2022 | Erlingsson | H04L 67/10 |

OTHER PUBLICATIONS

Yigitoglu et al., "Distributed Orchestration in Large Scale IoT Systems", IEEE International Congress on Internet of Things, Jun. 25, 2017.*

* cited by examiner

IOT DEVICE MANAGEMENT APPARATUS, IOT DEVICE MANAGEMENT METHOD, AND PROGRAM

CROSS-REFERENCE TO RELATED APPLICATIONS

This application is a National Stage application under 35 U.S.C. § 371 of International Application No. PCT/JP2019/030684, having an International Filing Date of Aug. 5, 2019. The disclosure of the prior application is considered part of the disclosure of this application, and is incorporated in its entirety into this application.

TECHNICAL FIELD

The present invention relates to an IoT (Internet of Things) device management apparatus, an IoT device management method, and a program for acquiring information from an IoT device such as information equipment, industrial equipment, automobiles, and electrical home appliances including a sensor and a communication function unit and being connected by a network and performing analysis and the like of the acquired information.

BACKGROUND ART

In the future, a large number of IoT devices such as surveillance cameras are to be connected to networks such as a LAN (Local Area Network) and the Internet. For example, a camera as an IoT device is installed at various locations in a shopping center, and processing such as analyzing data (photographic data) photographed by the camera using an application associated with a compute is performed. FIG. 12 shows a configuration of an IoT device management system that performs such processing.

In an IoT device management system 10 shown in FIG. 12, inside a shopping center, three cameras 11, 12, and 13 are arranged in a first area 21 and two cameras 14 and 15 are arranged in a second area 22.

In the first area 21, three applications, namely, a first application 11A that processes photographic data of the camera 11, a second application 12A that processes photographic data of the camera 12, and a third application 13A that processes photographic data of the camera 13 are mounted to and associated with one compute 31.

In the second area 22, two applications, namely, a fourth application 14A that processes photographic data of the camera 14 and a fifth application 15A that processes photographic data of the camera 15 are mounted to and associated with another compute 32. It should be noted that a compute refers to a computer which constitutes a virtual machine such as a virtual server by being associated with an application. In the present specification, an application is assumed to be a concept that includes a virtual machine.

In such a configuration, it is assumed that the camera 11 in the first area 21 photographs an adult man 23 and a woman 24 and a girl 25, as well another woman 26 and various items 26a in a shopping cart. The camera 12 photographs the woman 26 and various items 26b. The camera 13 photographs the woman 26 and various items 26c.

It is assumed that the camera 14 in the second area 22 photographs an adult woman 27 and various items 27a inside a shopping bag, and the camera 15 photographs the adult woman 27 and the various items 27a.

Photography by the respective cameras 11 to 15 enable genders of shoppers and whether the shoppers are adults or children to be determined, purchased items placed inside a shopping cart to be determined, and the like.

Photographic data of a camera contain many overlaps and analyzing all of the pieces of data in detail to identify people, determine what the people purchased, and the like ends up wasting compute and application resources. Therefore, overlapping data included in photographic data must be efficiently processed. For example, using a technique described in PTL 1 in the processing described above enables overlapping data to be efficiently processed to reduce a processing load, and wasteful consumption of resources can be prevented by the reduction.

CITATION LIST

Patent Literature

[PTL 1] JP 2013-182553A

SUMMARY OF THE INVENTION

Technical Problem

As shown in FIG. 12, the cameras 11 to 15 as IoT devices are arranged in plurality in the respective areas 21 and 22, and a configuration is adopted in which, for example, the plurality of applications 11A to 13A that analyze the pieces of photographic data of the plurality of cameras 11 to 13 arranged in the first area 21 are associated with the same compute 31. In this configuration, when the one compute 31 fails as indicated by x, all of the plurality of applications 11A to 13A associated with the compute 31 become incapable of processing. Therefore, photographic information on people, purchased items, and the like in the area 21 where the cameras 11 to 13 related to the applications 11A to 13A which have become incapable of processing can no longer be acquired and availability declines. In other words, a problem arises in that availability of continuously performing predetermined processing such as analyzing information obtained from IoT devices and the like declines.

The present invention has been made in consideration of such circumstances and an object thereof is to prevent availability of continuously performing predetermined processing on information acquired from IoT devices from declining in the event of a failure of a compute.

Means for Solving the Problem

In order to solve the problem described above, an IoT (Internet of Things) device management apparatus according to the present invention includes: a locality calculating unit which receives a result of predetermined processing having been performed with respect to acquired information from an IoT device by an application associated with a compute so as to constitute a virtual machine and which, by determining a locality indicating a closeness of arrangement positions of a plurality of IoT devices to be high when a degree of coincidence among pieces of acquired information from the IoT devices representing received results is high, calculates locality information that is a result of the determination; and a control unit which extracts a pair of IoT devices with a high locality from the locality information and which performs control for associating applications related to the extracted pair of IoT devices with different computes.

Effects of the Invention

According to the present invention, availability of continuously performing predetermined processing on information acquired from IoT devices can be prevented from declining in the event of a failure of a compute.

DESCRIPTION OF EMBODIMENTS

Figure 1:
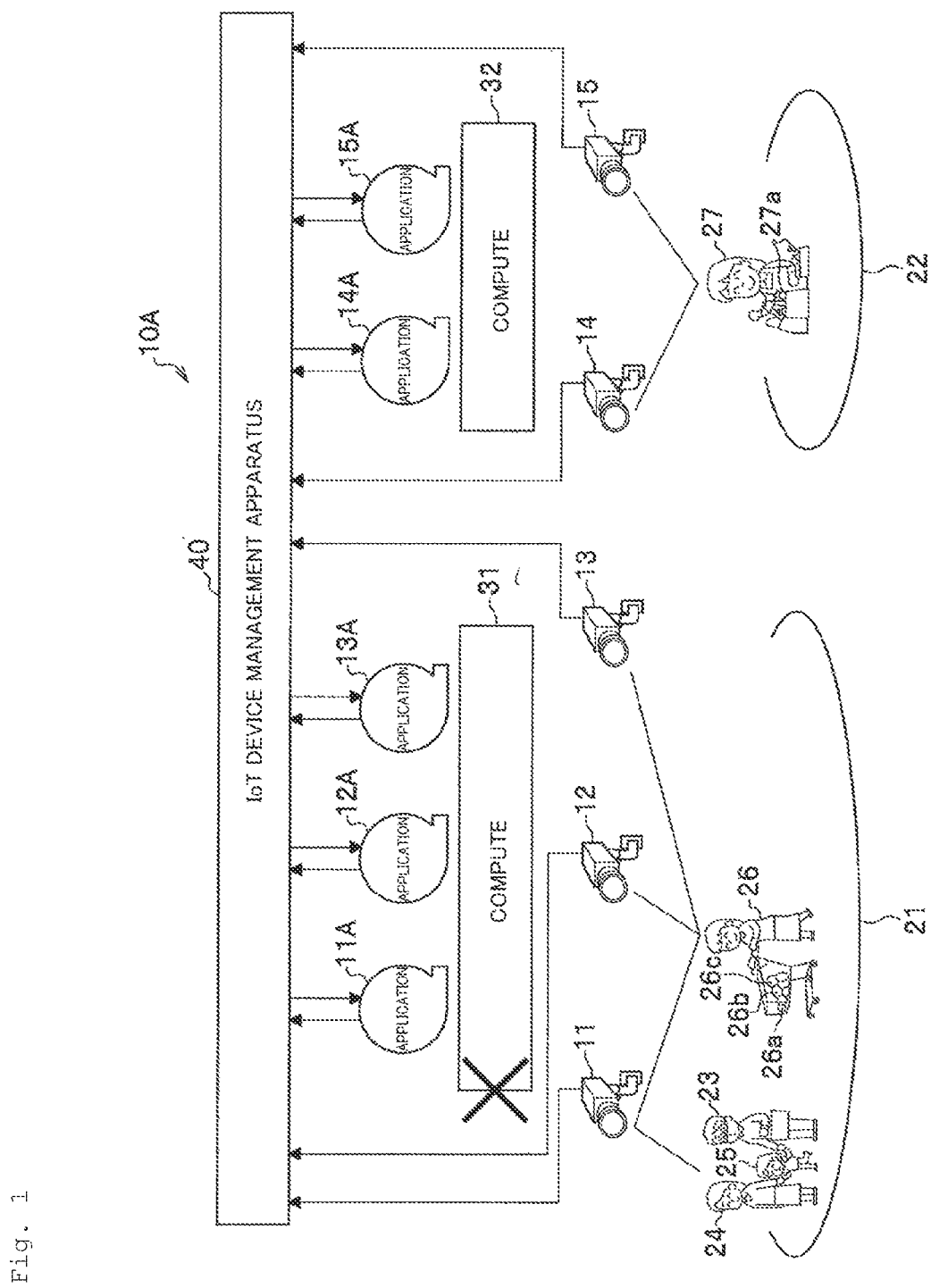
FIG. 1 is a diagram showing a configuration of an IoT device management system provided with an IoT device management apparatus according to an embodiment of the present invention.

Hereinafter, an embodiment of the present invention will be described with reference to the drawings. However, constituent portions to which functions correspond in all drawings of the present specification will be assigned same reference characters and descriptions thereof will be omitted when appropriate.

<Configuration of Embodiment>

Figure 12:
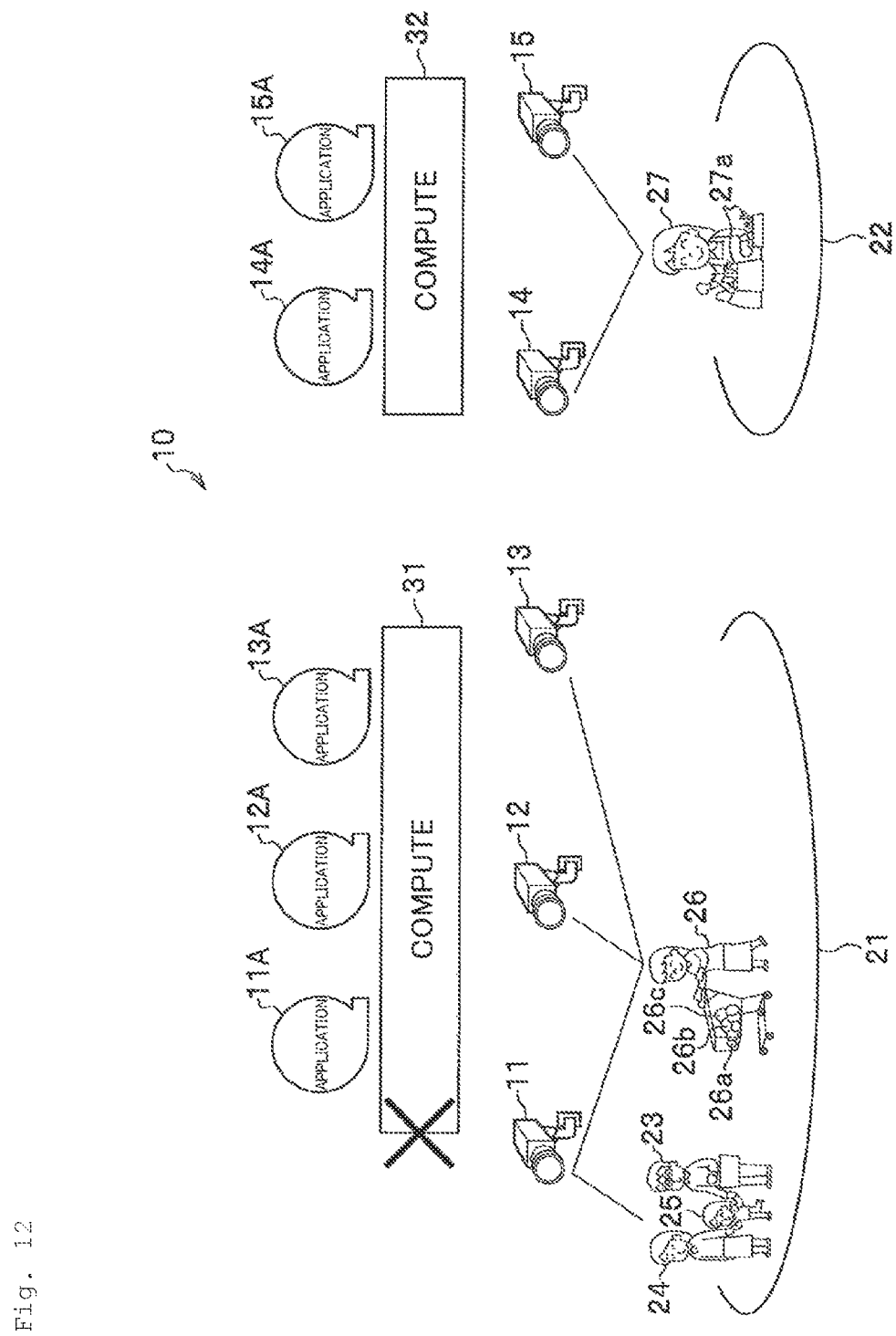
FIG. 12 is a diagram showing a configuration of a conventional IoT device management system.

FIG. 1 is a diagram showing a configuration of an IoT device management system provided with an IoT device management apparatus according to an embodiment of the present invention. An IoT device management system (also referred to as a system) 10A shown in FIG. 1 differs from the conventional system 10 (FIG. 12) in that an IoT device management apparatus (also referred to as a management apparatus) 40 is provided.

The management apparatus 40 is connected to a plurality of cameras 11 to 15, a plurality of applications 11A to 15A, and a plurality of computes 31 and 32. As will be described later, the management apparatus 40 performs prioritization processing of the cameras 11 to 15 which are IoT devices, distributed arrangement processing and recovery (also referred to as healing) processing of the applications 11A to 15A upon a failure of the cameras 11 to 15 or the computes 31 and 32.

Figure 2:
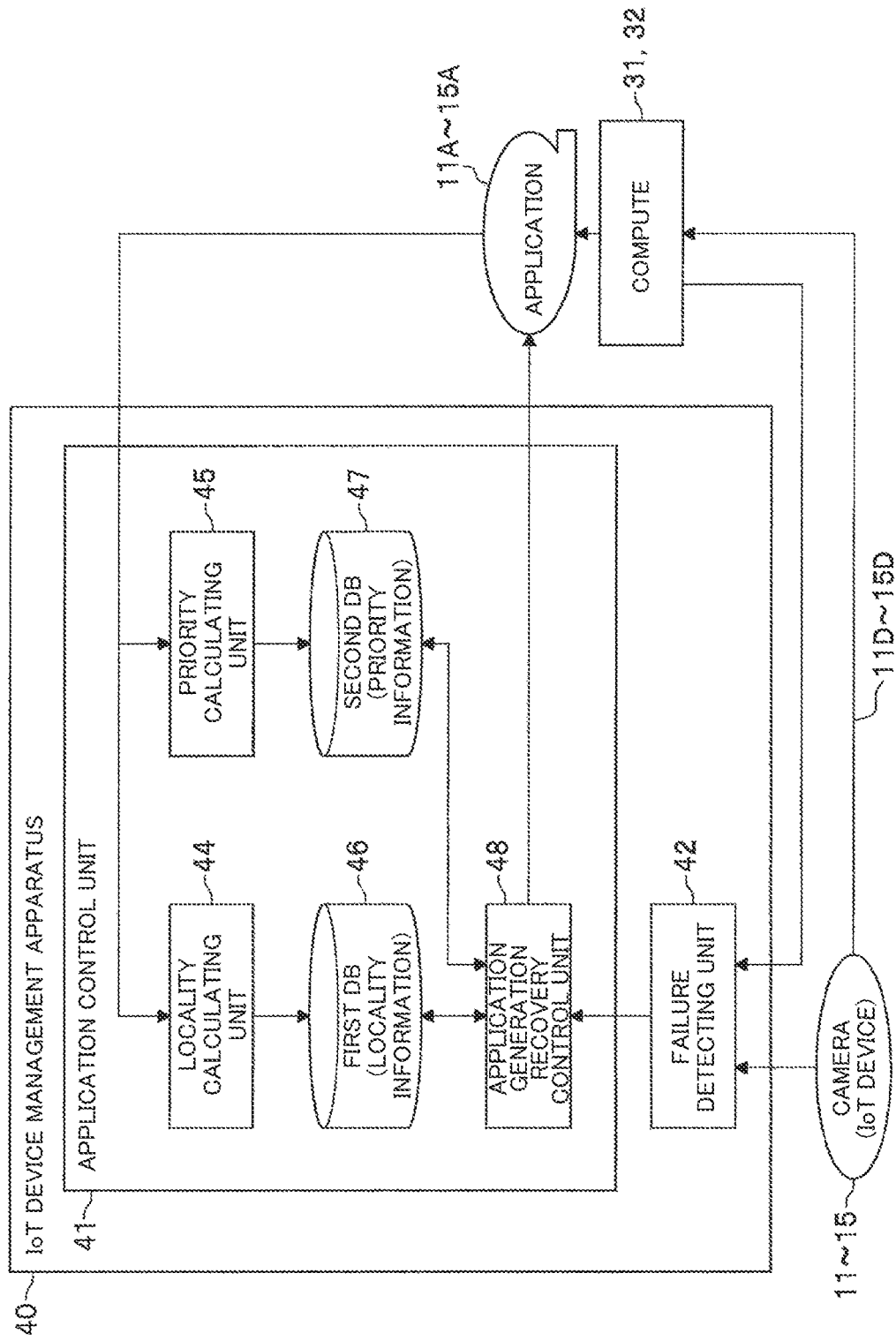
FIG. 2 is a block diagram showing a configuration of the IoT device management apparatus according to the embodiment of the present invention.

As shown in FIG. 2, the management apparatus 40 is provided with an application control unit 41 and a failure detecting unit 42. The application control unit 41 is configured so as to include a locality calculating unit 44, a priority calculating unit 45, a first DB (Data Base) 46, a second DB 47, and an application generation recovery control unit 48. It should be noted that the application generation recovery control unit 48 constitutes the control unit described in the claims.

The priority calculating unit 45 prioritizes the respective cameras 11 to 15 in an order in which various types of photographic data (acquired information) are obtained. When the pieces of photographic data of the cameras 11 to 15 are input to the applications 11A to 15A via the computes 31 and 32, the applications 11A to 15A perform processing of analyzing people and types of items in each piece of photographic data. The priority calculating unit 45 prioritizes the respective cameras 11 to 15 in accordance with the number of types of data following the processing.

Figure 3:
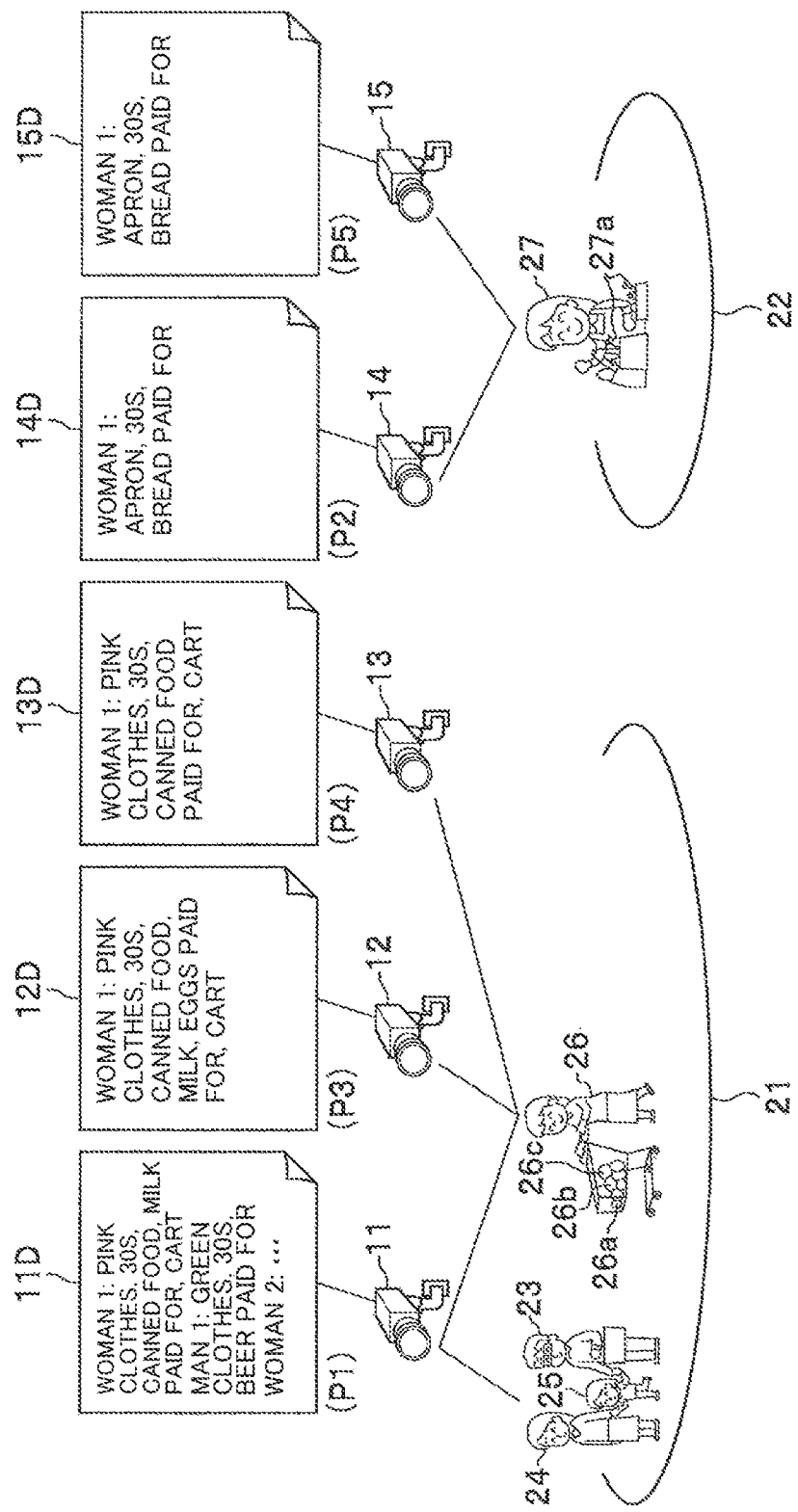
FIG. 3 is a diagram for explaining a method of prioritizing each camera by the IoT device management apparatus according to the present embodiment.

A method of the prioritization will be described with reference to FIG. 3. The cameras 11 to 13 are arranged in a first area 21. Photographic data 11D of the camera 11 among the cameras includes "Woman 1: pink clothes, 30s, canned food, milk, cart" as information representing a woman 26 in her 30s and wearing pink clothes and various items 26a in a shopping cart. Furthermore, the photographic data 11D includes "Man 1: green clothes, 30s, beer, Woman 2: . . . " as information representing a man 23 in his 30s wearing green clothes and carrying a shopping bag containing beer (not illustrated) already paid for, two women 24 and 25, and the like.

Photographic data 12D of the camera 12 includes "Woman 1: pink clothes, 30s, canned food, milk, eggs, cart" as information representing the woman 26 in her 30s and wearing pink clothes and various items 26b in a shopping cart.

Photographic data 13D of the camera 13 includes "Woman 1: pink clothes, 30s, canned food, cart" as information representing the woman 26 in her 30s and wearing pink clothes and various items 26c in a shopping cart.

Among the cameras 14 and 15 arranged in the second area 22, photographic data 14D of the camera 14 includes "Woman 1: apron, 30s, bread" as information representing a woman 27 in her 30s and wearing an apron and various items 27a in a shopping bag being carried by the woman 27.

In a similar manner to the camera 14, photographic data 15D of the camera 15 includes "Woman 1: apron, 30s, bread" as information representing the woman 27 in her 30s and wearing an apron and the various items 27a in a shopping bag being carried by the woman 27.

Based on the pieces of photographic data 11D to 15D described above, the priority calculating unit 45 prioritizes the cameras 11 to 15. A highest priority is to be given to the camera 11 that obtains the largest amount of information. As described above, since the photographic data 11D of the camera 11 contains the largest amount of information, the camera 11 is given the highest priority (P1).

Next, a second highest priority is to be given to a camera that obtains the largest amount of information excluding overlapping data with the highest priority (P1). In this case, the photographic data 12D of the camera 12 is only "eggs" when excluding overlapping data with the photographic data 11D of the highest priority camera 11, and the photographic data 13D of the camera 13 is "0". Therefore, since the amount of information in the photographic data 14D or 15D of the camera 14 or 15 that is separated from the camera 11 is second largest, for example, the camera 14 is given the second highest priority (P2). However, since the amounts of information in the pieces of photographic data 14D and 15D of the cameras 14 and 15 are the same, one of the cameras 14 and 15 is randomly given the second highest priority.

A third highest priority is given to a camera with the largest amount of information that remains after excluding overlapping data with the highest and second highest priorities. Specifically, the camera 12 is given the third highest priority (P3). Through similar processing, the camera 13 is given a fourth highest priority (P4) and the camera 15 is given a fifth highest priority (P5). In this manner, the priority calculating unit 45 determines the priorities of the cameras 11 to 15 and stores information on the priorities in a second DB 47 (FIG. 2).

When prioritization is performed in this manner, priorities are determined solely based on the pieces of photographic data 11D to 15D obtained from the cameras 11 to 15 regardless of performances of the cameras 11 to 15.

In addition, priorities are updated by the priority calculating unit 45 by regularly receiving the pieces of photographic data 11D to 15D of the cameras 11 to 15.

Furthermore, a performance level (an application performance level) or an amount of resource allocation of the applications 11A to 15A (FIG. 1) may be changed in accordance with priorities. For example, the amount of resource allocation is increased and the application performance level is raised with respect to corresponding applications 11A to 15A in a descending order of priorities of the cameras 11 to 15. In the example shown in FIG. 3, the amount of resource allocation is increased and the application performance level is raised in an order of the application 11A of the camera 11 (P1), the application 14A of the camera 14 (P2), the application 13A of the camera 12 (P3), the application 14A of the camera 13 (P4), and the application 15A of the camera 15 (P5).

Figure 4:
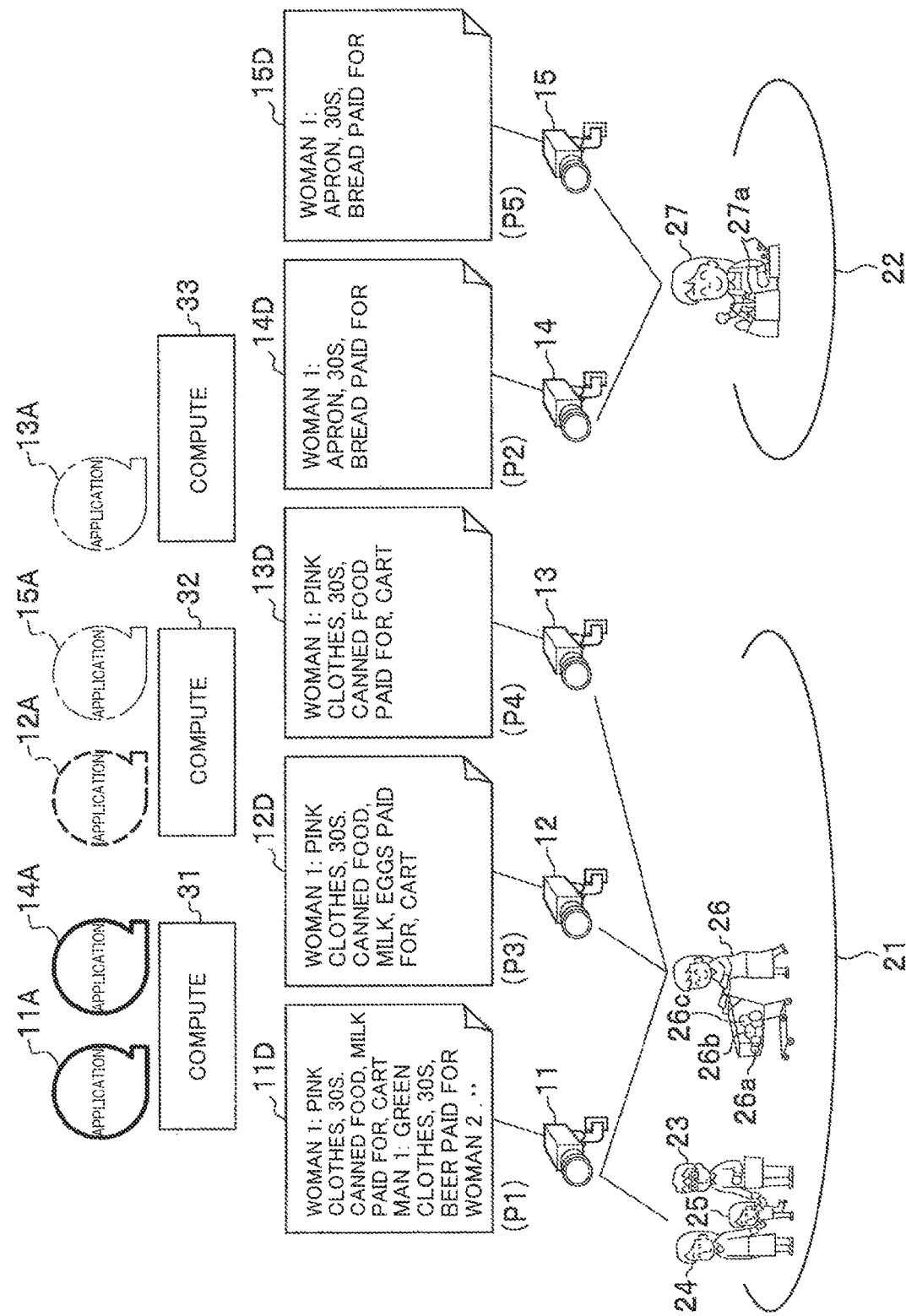
FIG. 4 is a diagram for explaining an operation when setting a priority by the IoT device management apparatus according to the present embodiment such that the wider an amount of information coverage, the higher the priority.

Alternatively, as shown in FIG. 4, a higher priority may be given to an application capable of covering a larger amount of information. In the present example, the applications 11A and 14A indicated by solid lines have the largest amount of resource allocation and enable detailed analysis, the application 12A indicated by a dashed line has the second largest amount of resource allocation and enables analysis at a standard level, and the applications 15A and 13A indicated by dashed-dotted lines have the third largest amount of resource allocation and enable simple analysis. The applications 11A and 14A are associated with the compute 31, the applications 12A and 15A are associated with the compute 32, and the application 13A is associated with a compute 33.

On the other hand, with respect to cameras (for example, the cameras 13 and 15) of which priorities are lower than a predetermined rank, the control unit 48 may prevent the pieces of photographic data 13D and 15D from being analyzed by the applications 13A and 15A. According to the processing, a processing load on the system 10A can be reduced.

Next, the locality calculating unit 44 shown in FIG. 2 calculates localities of the cameras 11 to 15. The locality is an index indicating whether or not a plurality of (for example, two) cameras are arranged close to each other, and a higher locality indicates that the two cameras are arranged closer to each other.

When calculating the locality, the locality calculating unit 44 obtains a degree of coincidence between pieces of photographic data of a plurality of cameras such as the pieces of photographic data 14D and 15D of the two cameras 14 and 15 and determines that the higher the degree of coincidence, the higher the locality. For example, since the degree of coincidence between the pieces of photographic data 14D and 15D of the two cameras 14 and 15 is a complete coincidence, the locality calculating unit 44 determines that the locality between the cameras 14 and 15 is highest and calculates locality information reflecting a result of the determination. The locality information is stored in the first DB 46.

The control unit 48 obtains a pair of cameras with a high locality from the locality information stored in the first DB 46 and controls the pair of cameras so that, according to an anti-affinity rule, each camera is associated with computes 31 and 32 that are as different from each other as possible. For example, among the cameras 11, 12, and 13 arranged in the first area 21, the camera 12 and the camera 13 have a high degree of coincidence and a high locality. Therefore, as shown in FIG. 4, the control unit 48 performs control so as to associate one camera 12 with the compute 32 and associate the other camera 13 with another compute 33.

Next, assigning a score indicating levels of priority and locality of the cameras 11 to 15 described above will be explained.

First, scoring of priorities will be explained using an example of a service for checking purchase information of a shopper. In this case, test trials are regularly performed, and a relationship between a priority score of each camera and a locality between respective cameras is obtained from data produced by the test over a specific period in the past. The relationship of locality is obtained as follows from a degree of coincidence of information on a purchase of items by a person with a high identity per unit time between a certain pair of cameras.

Figure 5:
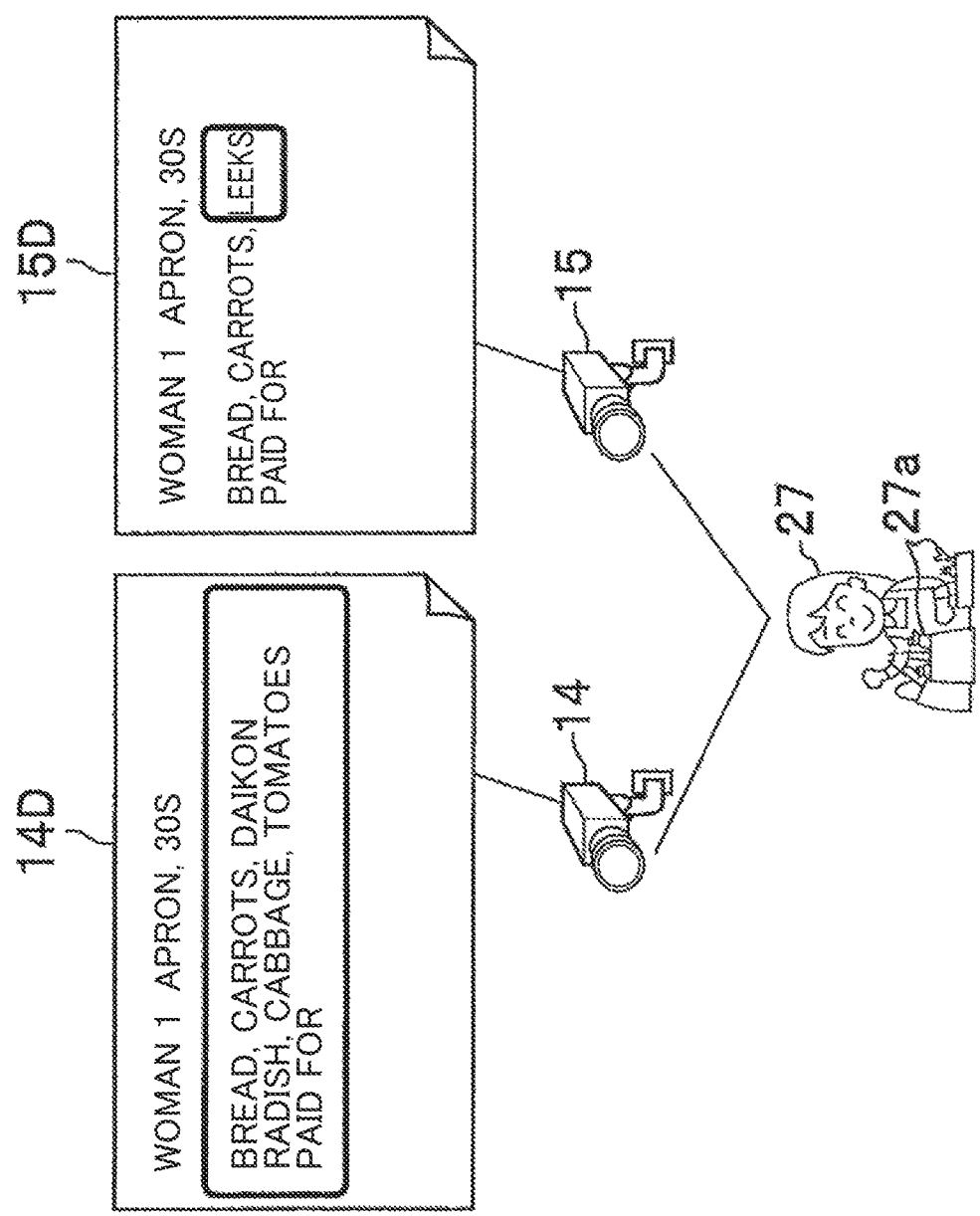
FIG. 5 is a diagram for explaining an operation of assigning a score indicating levels of priority and locality to each camera by the IoT device management apparatus according to the present embodiment.

For example, the number of pieces of information obtained from the photographic data 14D of the camera 14 shown in FIG. 5 are five pieces of information of "bread, carrots, daikon radish, cabbage, and tomatoes". The number of pieces of information obtained from the photographic data 15D of the camera 15 are assumed to be three pieces of information of "bread, carrots, and leeks". In this case, the number of pieces of information that coincide between the cameras 14 and 15 are the two pieces of information of "bread and carrots".

The control unit 48 obtains a correlation coefficient of photographic information (locality information) of both cameras 14 and 15 from equation (1) below.

(Number of coinciding pieces of information×number of cameras)/(number of pieces of photographed information of one camera+number of pieces of photographed information of other camera)=correlation coefficient    (1)

By substituting numerical values of the example shown in FIG. 5 described above into equation (1), since (2×2)/(5+

3)=0.5, the correlation coefficient is obtained as 0.5. The correlation coefficient is used as follows.

When the pieces of photographed information of the cameras 14 and 15 completely coincide with each other, since numerator/denominator of equation (1) are the same, the correlation coefficient is "1". In the case of the correlation coefficient "1", by associating the camera 14 and the camera 15 to different computes 31 and 32 according to control by the control unit 48, even if one camera 14 fails, the other camera 15 can make up for the failed camera 14. For example, the higher the correlation coefficient over 0.5, the control unit 48 associates the camera 14 and the camera 15 with computes 31 and 32 that differ from each other.

In this case, the failure detecting unit 42 detects a failure of the cameras 11 to 15 or the computes 31 and 32 and notifies the control unit 48 of the failure.

Figure 6:
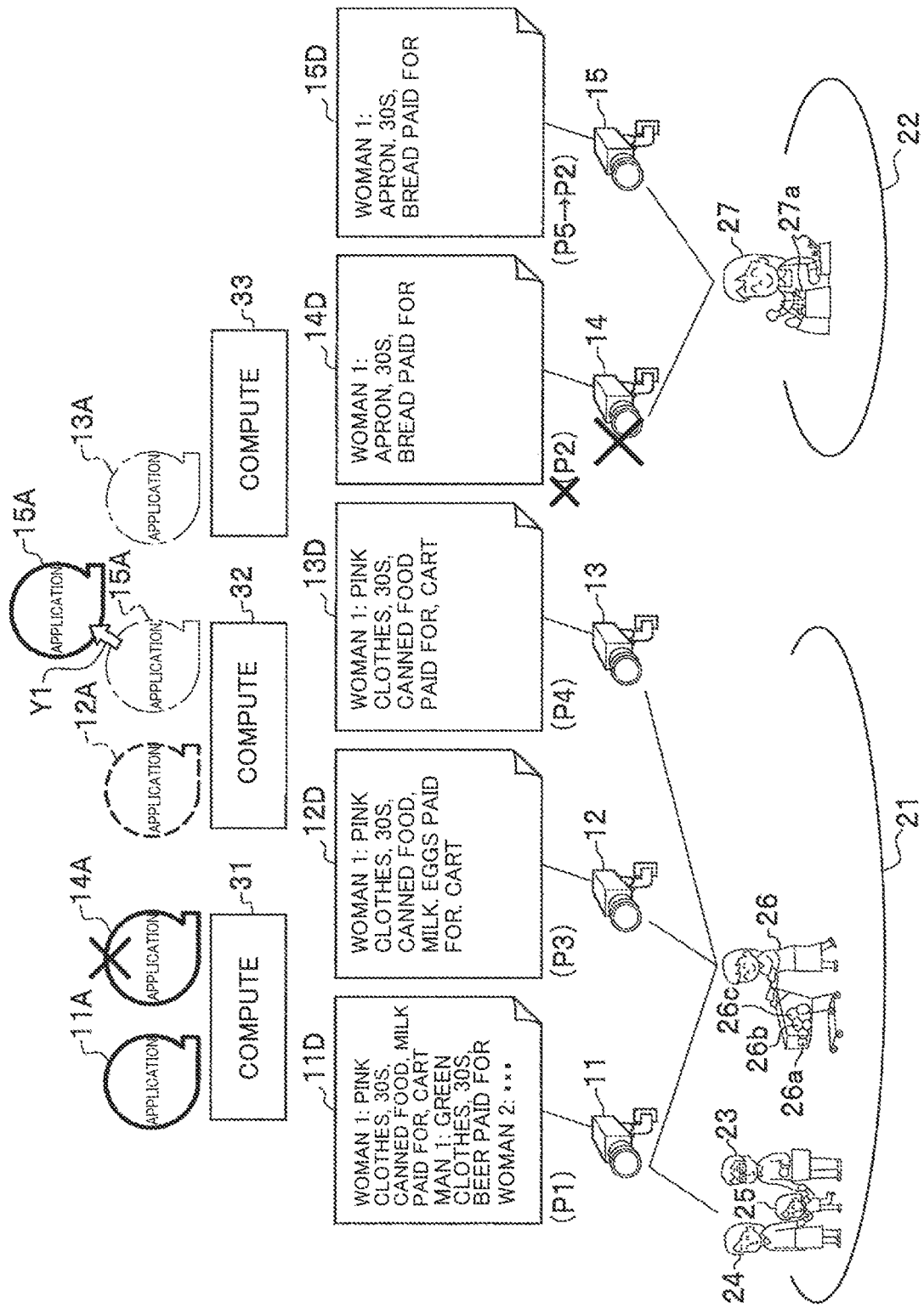
FIG. 6 is a diagram for explaining a recovery operation of an application upon a camera failure by the IoT device management apparatus according to the present embodiment.

For example, when the camera 14 with the second highest priority (P2) fails as indicated by x in FIG. 6, the application 14A related to the camera 14 also becomes inoperable as indicated by x. The control unit 48 having been notified of the failure from the failure detecting unit 42 (FIG. 2) raises the priority of the camera 15 that covers the same photographic information as the failed camera 14 from fifth highest (P5) to second highest (P2) that is the same rank as the failed camera 14.

In doing so, the application 15A associated with the compute 32 is set to the application 15A indicated by a solid line which has the largest amount of resource allocation and which enables detailed analysis as indicated by an arrow Y1. Due to this processing, same photographic information as the failed camera 14 can be obtained by the camera 15. It should be noted that this processing is a temporary measure and, subsequently, regular prioritization is performed once again to set correct priorities.

On the other hand, when the pieces of photographed information of the cameras 14 and 15 shown in FIG. 5 are completely non-coincident with each other, since the numerator of equation (1) is "0", the correlation coefficient is "0". In the case of the correlation coefficient "0", since there is no correlative relationship between both cameras 14 and 15, both cameras 14 and 15 may be associated with the same compute 32 or associated with different computes 31 and 32. For example, the lower the correlation coefficient at or below 0.5, the control unit 48 may associate the camera 14 and the camera 15 with the same compute 32 or with computes 31 and 32 that differ from each other.

Next, the control unit 48 shown in FIG. 2 obtains a priority score of each of the cameras 11 to 15. A priority score indicates the number of pieces of purchase information of a shopper that is obtained per unit time from video information of cameras.

For example, as described above, let us assume that the number of pieces of photographic information obtained from the camera 14 shown in FIG. 5 is "5", the number of pieces of photographic information obtained from the camera 15 is "3", and among these pieces of photographic information, the number of pieces of photographic information coinciding between the cameras 14 and 15, namely "bread and carrots", is "2". In this case, in accordance with the prioritization method described earlier, the control unit 48 obtains "5" for "bread, carrots, daikon radish, cabbage, and tomatoes" as the priority score of the camera 14 and "1" for "leeks" as the priority score of the camera 15.

The priority score is an index indicating that, the higher the score, the higher the priority. In other words, the priority score is an index such that, the higher the priority of the cameras 11 to 15 of an application, the larger an amount of application allocation. In addition, the priority score is also an index of healing prioritization indicating which camera is to be recovered first when the compute 31 or 32 fails.

Figure 7:
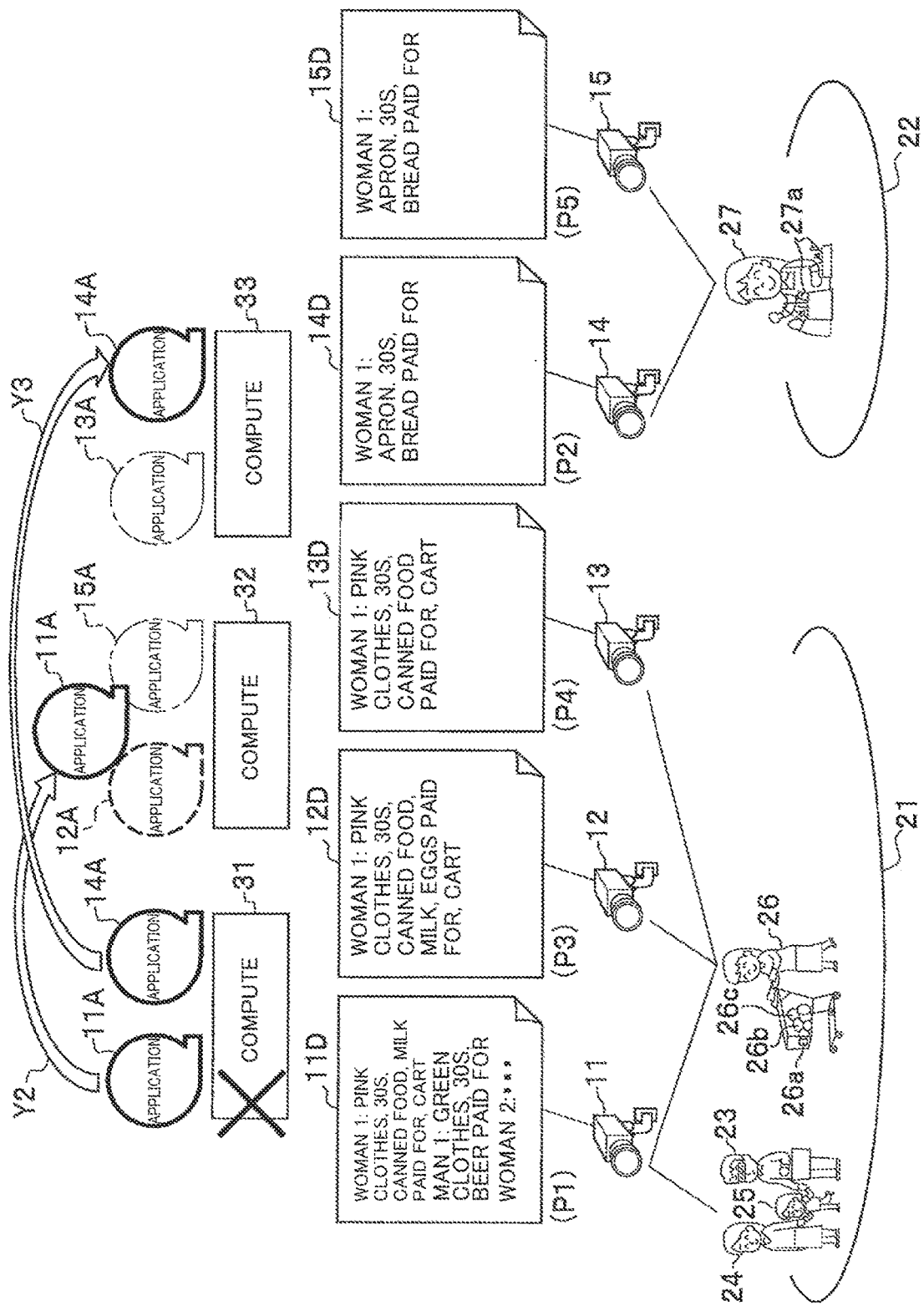
FIG. 7 is a diagram for explaining a recovery operation of an application upon a compute failure by the IoT device management apparatus according to the present embodiment.

For example, as indicated by x in FIG. 7, in the event that a failure occurs in the compute 31, when healing the applications 11A and 14A associated with the compute 31, the control unit 48 refers to the priority information in the second DB 47 and sequentially performs healing of applications 11A and 14A in a descending order of priority of the cameras 11 and 14. First, the application 11A of the camera 11 with the highest priority is associated with the compute 32 as indicated by an arrow Y2 and, next, the application 14A of the camera 14 with the second highest priority is associated with the compute 33 as indicated by an arrow Y3. The association is reflected onto the priority information in the second DB 47.

In addition, as shown in FIG. 1, when a camera (for example, the camera 11) with a high priority among the cameras 11 to 13 associated with the same compute 31 fails, the control unit 48 sequentially raises priorities of the normal cameras 12 and 13 of which priorities are lower than the failed camera. The raising is reflected onto the priority information in the second DB 47. Due to the raising of the priorities, the photographic data that should have been obtained from the failed camera 11 can be covered. In addition, when the failed camera 11 is recovered after raising the priorities, the control unit 48 once again prioritizes all cameras 11 to 15 including the recovered camera 11.

<Hardware Configuration>

Figure 8:
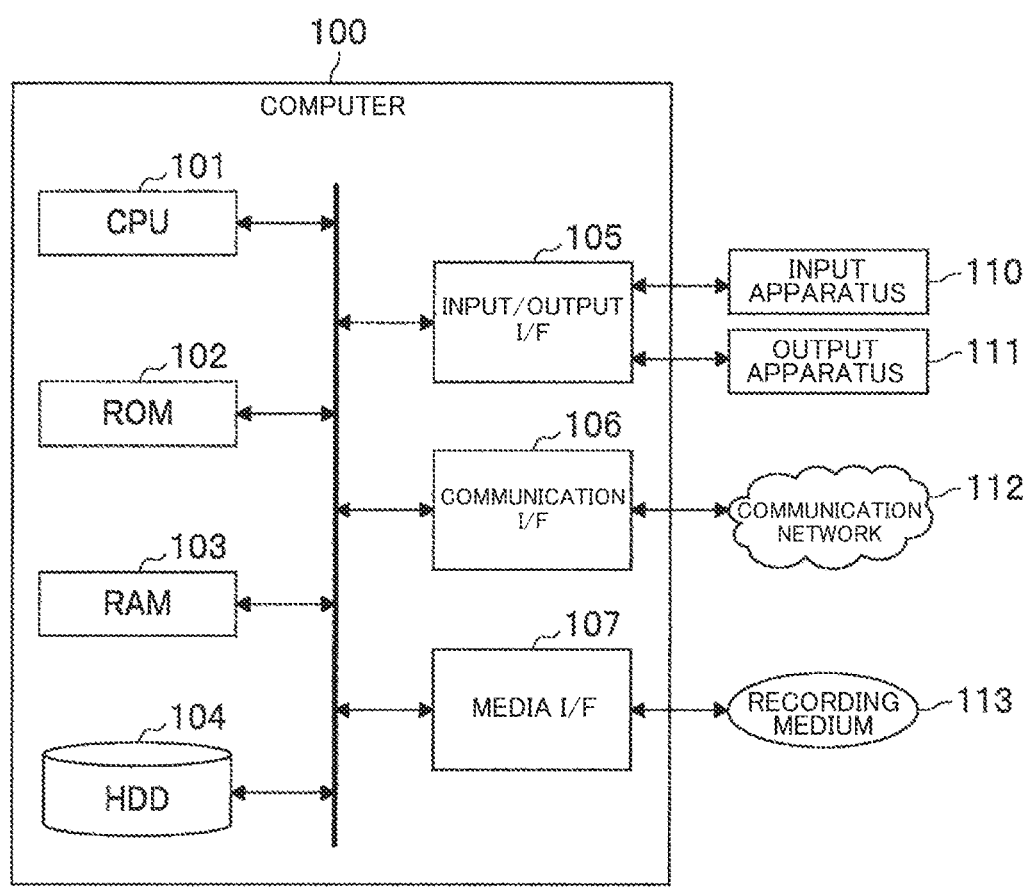
FIG. 8 is a hardware configuration diagram showing an example of a computer that realizes functions of the IoT device management apparatus according to the present embodiment.

The IoT device management apparatus 40 according to the embodiment described above is realized by, for example, a computer 100 configured as shown in FIG. 8. Hereinafter, the management apparatus 40 will be described as an example. FIG. 8 is a hardware configuration diagram showing an example of the computer 100 that realizes functions of the management apparatus 40. The computer 100 has a CPU (Central Processing Unit) 101, a ROM (Read Only Memory) 102, a RAM (Random Access Memory) 103, an HDD (Hard Disk Drive) 104, an input/output I/F (Inter Face) 105, a communication I/F 106, and a media I/F 107.

The CPU 101 operates based on a program stored in the ROM 102 or the HDD 104 and controls the respective functional units. The ROM 102 stores a boot program that is executed by the CPU 101 when the computer 100 is started up, programs related to hardware of the computer 100, and the like.

The CPU 101 controls an output apparatus 111 such as a printer or a display and an input apparatus 110 such as a mouse or a keyboard via the input/output I/F 105. The CPU 101 acquires data from the input apparatus 110 or outputs generated data to the output apparatus 111 via the input/output I/F 105.

The HDD 104 stores a program to be executed by the CPU 101 and data and the like to be used by the program. The communication I/F 106 receives data from another apparatus (not illustrated) via a communication network 112 and outputs the received data to the CPU 101, and transmits data generated by the CPU 101 to the other apparatus via the communication network 112.

The media I/F 107 reads a program or data stored in a recording medium 113 and outputs the program or data to the CPU 101 via the RAM 103. The CPU 101 loads a program related to desired processing onto the RAM 103 from the recording medium 113 via the media I/F 107 and executes the loaded program. The recording medium 113 is an optical recording medium such as a DVD (Digital Versatile Disc) or a PD (Phase change rewritable Disk), a magneto optical recording medium such as an MO (Magneto Optical disk), a magnetic recording medium, a conductor memory tape medium, a semiconductor memory, or the like.

For example, when the computer 100 functions as the management apparatus 40 according to the embodiment, the CPU 101 realizes the functions of the management apparatus 40 by executing a program loaded onto the RAM 103. In addition, data in the RAM 103 is stored in the HDD 104. The CPU 101 reads a program related to desired processing from the recording medium 113 and executes the loaded program. Alternatively, the CPU 101 may read a program related to desired processing from another apparatus via the communication network 112.

<Operations According to Embodiment>

Figure 9:
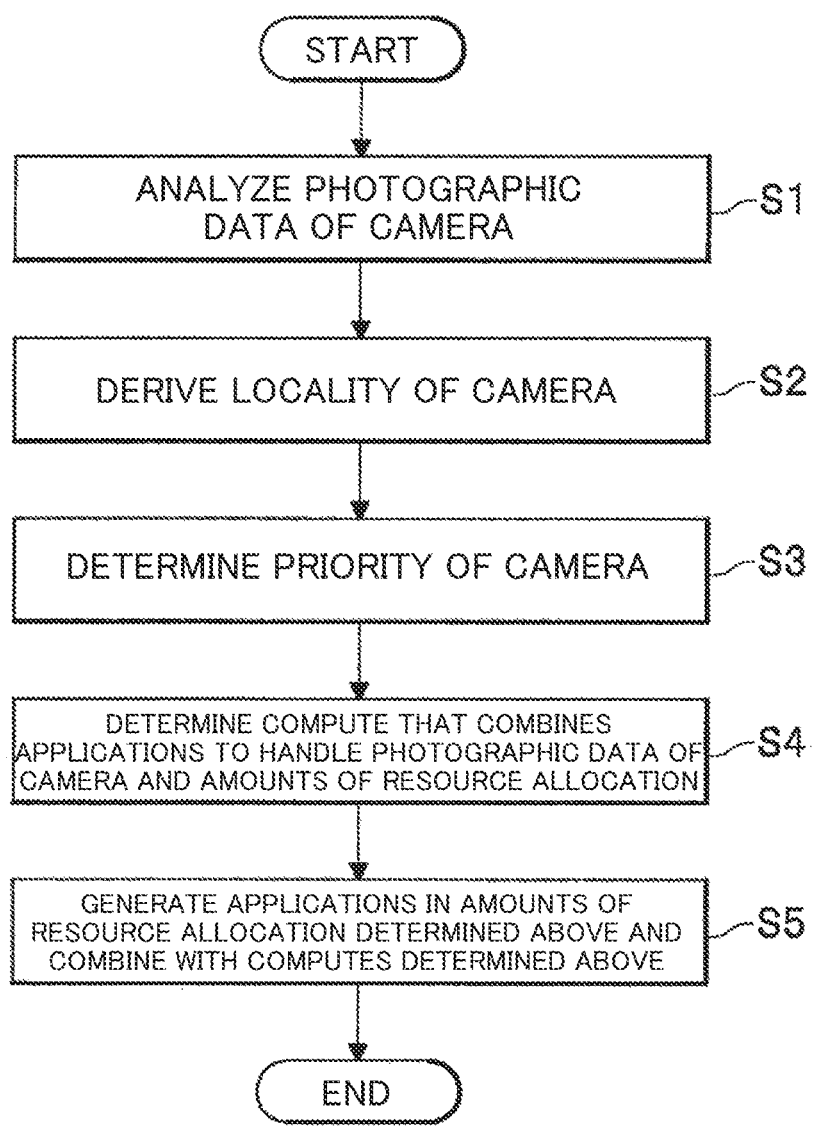
FIG. 9 is a flow chart for explaining an operation of initialization of the IoT device management apparatus according to the present embodiment.
Figure 10:
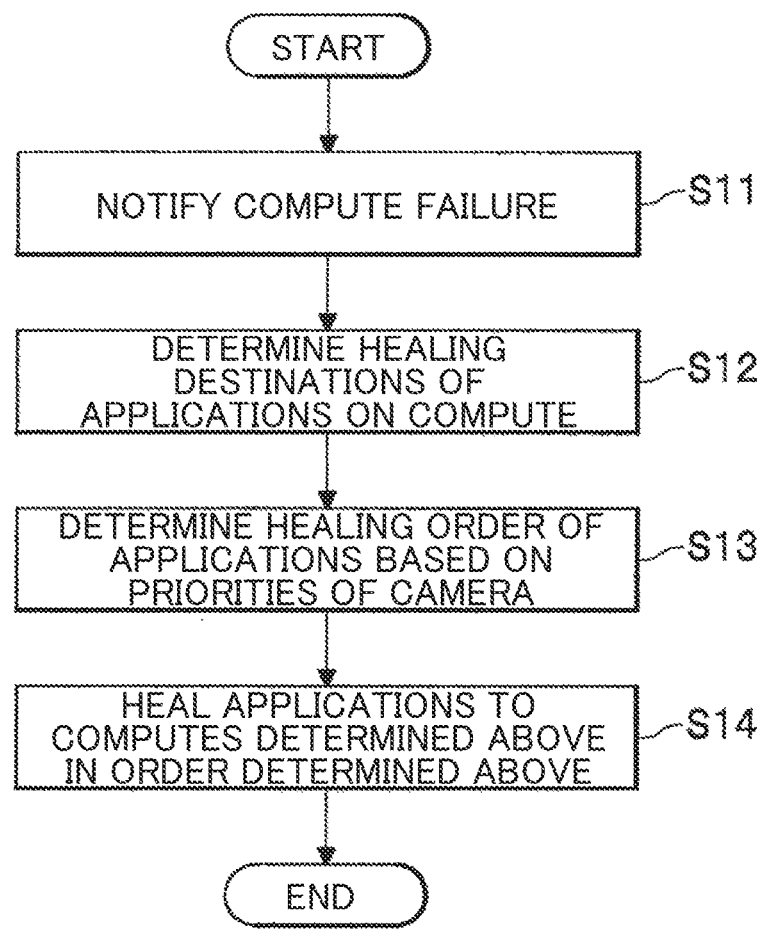
FIG. 10 is a flow chart for explaining an operation upon a compute failure of the IoT device management apparatus according to the present embodiment.
Figure 11:
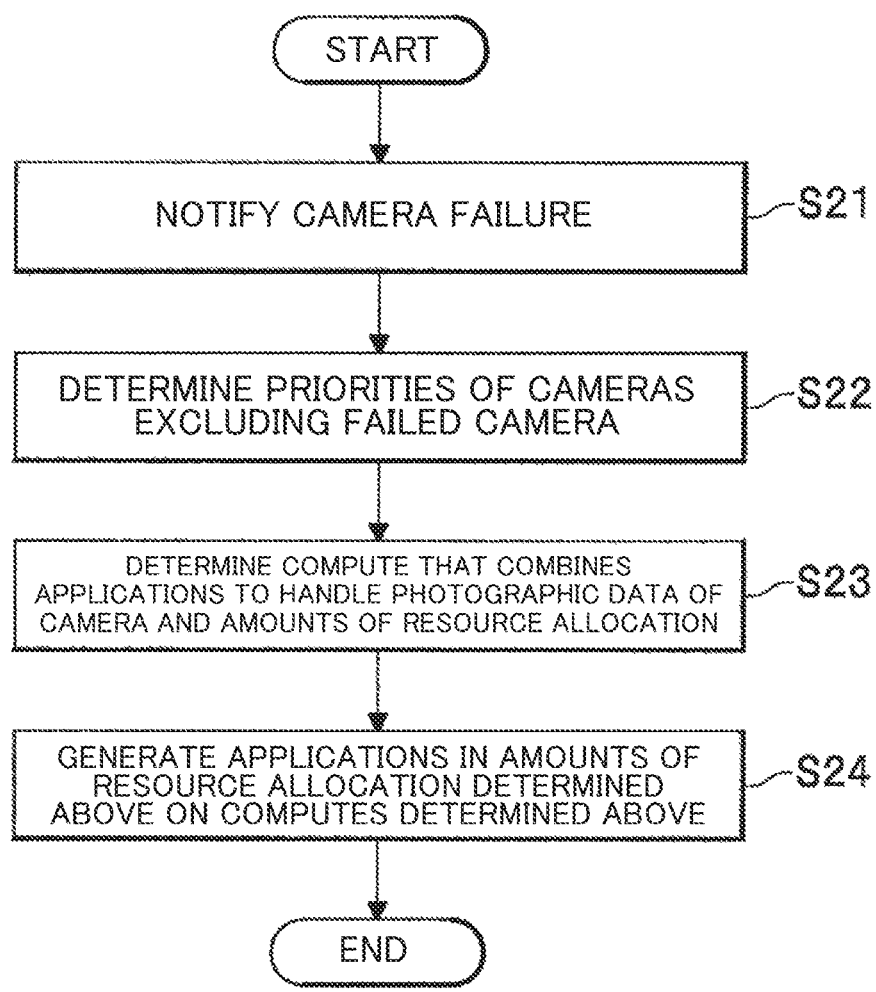
FIG. 11 is a flow chart for explaining an operation upon a camera failure of the IoT device management apparatus according to the present embodiment.

Next, operations of the IoT device management system 10A according to the present embodiment will be described with reference to flow charts shown in FIGS. 9 to 11.

<Initialization Operation>

First, an operation of initialization of the system 10A shown in FIG. 1 will be described with reference to the flow chart shown in FIG. 9. In the system 10A in an initial state, which of the computes 31 and 32 the applications 11A to 15A of the cameras 11 to 15 are to be associated with is not determined.

In consideration thereof, the applications 11A to 15A corresponding to the cameras 11 to 15 are temporarily associated with the computes 31 and 32. In addition, in step S1 shown in FIG. 9, the pieces of photographic data 11D to 15D of the cameras 11 to 13 arranged in the first area 21 and the cameras 14 and 15 arranged in the second area 22 in a shopping center are analyzed by the applications 11A to 15A. As a result of the analysis, various types of information such as people and purchased items in the pieces of photographic data 11D to 15D shown in FIG. 3 are obtained and output to the locality calculating unit 44 and the priority calculating unit 45 in the application control unit 41 of the management apparatus 40.

Next, in step S2, the locality calculating unit 44 derives localities of the cameras 11 to 15 from the various types of information in the input pieces of photographic data 11D to 15D as follows. Specifically, the locality calculating unit 44 obtains a degree of coincidence of the respective pieces of photographic data 11D to 15D using, for example, a correlation coefficient, and determines a locality such that the higher the degree of coincidence, the higher the locality.

For example, since the degree of coincidence between the pieces of photographic data 14D and 15D (FIG. 3) of the two cameras 14 and 15 is a complete coincidence, the locality calculating unit 44 determines that the locality between the cameras 14 and 15 is highest. Next, the locality calculating unit 44 determines that the locality between the cameras 12 and 13 is next highest and, further, determines that the locality of the camera 11 with respect to the cameras 12 and 13 is next highest. The locality calculating unit 44 stores locality information reflecting a result of the determination in the first DB 46.

Next, in step S3, the priority calculating unit 45 determines priorities of the cameras 11 to 15 as follows in accordance with the number of types of the input pieces of photographic data 11D to 15D. In other words, as shown in FIG. 3, since the photographic data 11D of the camera 11 contains the largest amount of information, the priority calculating unit 45 gives the camera 11 the highest priority (P1).

Next, the priority calculating unit 45 gives a second highest priority (P2) to the camera 14 that obtains the largest amount of information excluding overlapping data with the highest priority. Next, the priority calculating unit 45 gives a third highest priority (P3) to the camera 12 with the largest amount of information that remains after excluding overlapping data with the highest priority and the second highest priority, and gives a fourth highest priority (P4) to the camera 13 and a fifth highest priority (P5) to the camera 15 through similar processing.

Next, in step S4, the control unit 48 shown in FIG. 2 determines the computes 31 and 32 which the applications 11A to 15A that handle the pieces of photographic data 11D to 15D of the cameras 11 to 15 are to be associated with and amounts of resource allocation as follows.

Specifically, the control unit 48 obtains a pair of cameras with a high locality from the locality information stored in the first DB 46 and makes a determination so that, according to an anti-affinity rule, the pair of cameras is associated with computes 31, 32, and 33 (FIG. 4) that are as different from each other as possible. For example, among the cameras 11, 12, and 13 arranged in the first area 21, since the camera 12 and the camera 13 have a high degree of coincidence and a high locality, as shown in FIG. 4, the control unit 48 makes a determination to associate one camera 12 with the compute 32 and associate the other camera 13 with another compute 33.

In addition, based on priority information of the cameras 11 to 15 stored in the second DB 47, the control unit 48 determines amounts of resource allocation of the applications 11A to 15A as follows. For example, the control unit 48 increases the amount of resource allocation and raises the application performance level with respect to corresponding applications 11A to 15A in a descending order of priorities of the cameras 11 to 15. Specifically, the applications 11A and 14A indicated by solid lines in FIG. 4 are given a largest amount of resource allocation, the application 12A indicated by a dashed line is given a second largest amount of resource allocation, and the applications 15A and 13A indicated by dashed-dotted lines are given a third largest amount of resource allocation.

Next, in step S5, the control unit 48 generates the respective applications 11A to 15A with the amounts of resource allocation determined in step S4 described above and performs control for associating the generated applications 11A to 15A with the respective computes 31, 32, and 33. Specifically, as shown in FIG. 4, the applications 11A and 14A with the largest amount of resource allocation are associated with the compute 31, the application 12A with the second largest amount of resource allocation and the application 15A with the third largest amount of resource allocation are associated with the compute 32, and the application 13A with the third largest amount of resource allocation is associated with the compute 33.

<Compute Failure Operation>

Next, an operation upon a compute failure of the system 10A will be described with reference to the flow chart shown in FIG. 10.

In step S11, it is assumed that the control unit 48 receives a failure notification of the compute 31 shown in FIG. 7 from the failure detecting unit 42.

In step S12, the control unit 48 determines healing destinations of the applications 11A and 14A on the failed compute 31. The determination is made so that the applications 11A and 14A are arranged in a distributed manner at normal computes 32 and 33.

In step S13, based on the priorities of the cameras 11 to 15 determined in step S3 described earlier, the control unit 48 determines an order of healing of the applications 11A to 15A. Specifically, the control unit 48 makes a determination to associate, with the compute 32, the application 11A of the camera 11 with the highest priority among the applications 11A and 14A associated with the failed compute 31 as indicated by the arrow Y2. Next, the control unit 48 makes a determination to associate, with the compute 33, the application 14A of the camera 14 with the second highest priority as indicated by the arrow Y3.

In step S14, the control unit 48 performs control to heal the applications 11A and 14A determined in step S12 described above in the order of healing determined in step S13 described above. Specifically, control is performed so that, first, the application 11A of the camera 11 with the highest priority is associated with the compute 32 and, next, the application 14A of the camera 14 with the second highest priority is associated with the compute 33.

<Camera Failure Operation>

Next, an operation upon a camera failure of the system 10A will be described with reference to the flow chart shown in FIG. 11. In this case, the application 14A related to the failed camera 14 has also become inoperable.

In step S21, it is assumed that the control unit 48 receives a failure notification of the camera 14 shown in FIG. 6 from the failure detecting unit 42.

In step S22, the control unit 48 determines priorities of the cameras 11 to 13 and 15 excluding the failed camera 14. In this case, as shown in FIG. 6, the priority of the camera 15 that covers the same photographic information as the failed camera 14 is raised from P5 to P2 that is the same rank as the failed camera 14.

In step S23, based on the priorities of the cameras 11 to 13 and 15 determined in step S22 described above, the control unit 48 determines the computes 31, 32, and 33 which corresponding applications 11A to 13A and 15A are to be associated with and amounts of resource allocation.

Specifically, the control unit 48 makes a determination to associate the application 11A of the camera 11 with the highest priority with the compute 31, associate the application 15A of the camera 15 with the second highest priority and the application 12A of the camera 12 with the third highest priority with the compute 32, and associate the application 13A of the camera 13 with the fourth highest priority with the compute 33.

In doing so, the control unit 48 gives a largest amount of resource allocation to the applications 11A and 15A indicated by solid lines in FIG. 6, gives a second largest amount of resource allocation to the application 12A indicated by a dashed line, and gives a third largest amount of resource allocation to the application 13A indicated by a dashed-dotted line. In this determination, the application 15A given the second highest priority (P2) in step S22 described above becomes the application 15A indicated by a solid line with the largest amount of resource allocation as indicated by an arrow Y1.

Next, in step S24, the control unit 48 generates, on the computes 31, 32, and 33 determined in step S23 described above, the respective applications 11A to 13A and 15A in the amounts of resource allocation determined in S23 described above. Specifically, the application 11A with the largest amount of resource allocation is generated in association with the compute 31 and, at the same time, the application 15A with the largest amount of resource allocation is generated in association with the compute 32. The application 12A with the second largest amount of resource allocation is generated in association with the compute 32, and the application 13A with the third largest amount of resource allocation is generated in association with the compute 33.

<Effects>

(1) The IoT device management apparatus according to the present invention is configured so as to include: a locality calculating unit which receives a result of predetermined processing having been performed with respect to acquired information from an IoT device such as a camera by an application associated with a compute so as to constitute a virtual machine and which, by determining a locality indicating a closeness of arrangement positions of a plurality of IoT devices to be high when a degree of coincidence among pieces of acquired information from the IoT devices representing received results is high, calculates locality information that is a result of the determination; and a control unit which extracts a pair of IoT devices with a high locality from the locality information and which performs control for associating applications related to the extracted pair of IoT devices with different computes.

According to this configuration, even if one compute fails, an application corresponding to an application associated with the failed compute (or described as an application on the compute) is associated with another compute that is normal. Therefore, acquired information that is equivalent to a camera related to the application on the failed compute can be acquired from a camera related to an application on another compute. Therefore, in the event of a failure of a compute, availability of continuously performing predetermined processing on information acquired from a camera can be prevented from declining without making all of the applications on the failed compute inoperable.

(2) The IoT device management apparatus according to (1) described above is configured so as to include: a priority calculating unit that calculates priority information representing a prioritization of the plurality of IoT devices by performing processing of ranking the IoT devices in a descending order such that, among pieces of acquired information from the plurality of IoT devices, an IoT device that obtains a largest number of types of acquired information is given a highest priority, an IoT device that obtains a largest number of types of information excluding overlapping data with the highest priority is given a second highest priority, an IoT device that obtains a largest number of types of information excluding overlapping data with the highest priority and the second highest priority is given a third highest priority, and performing the processing in a similar manner with respect to the remaining IoT devices, wherein the control unit refers to the priority information and performs control to increase an amount of resource allocation with respect to corresponding applications in a descending order of priorities of the IoT devices.

According to this configuration, since the higher a priority of a camera, the larger the amount of resource allocation with respect to a corresponding application, an application performance level increases. Therefore, even when a large number of types of acquired information is obtained from a camera, predetermined processing such as analysis can be appropriately performed.

(3) The IoT device management apparatus according to (1) or (2) described above is configured so as to include: a failure detecting unit that detects a failure of the compute, wherein the control unit performs control of recovery when the failure detecting unit detects a failure to cause a plurality of applications associated with the failed compute to migrate to normal computes in a distributed manner.

According to this configuration, even when a compute fails, a plurality of applications which have become inoperable due to the failure can be recovered by causing the applications to migrate to normal computes in a distributed manner. Therefore, even when a compute fails, acquired information from a camera that corresponds to a camera related to the failed compute can be processed by an application on another compute that corresponds to the application on the failed compute.

(4) The IoT device management apparatus according to (2) described above is configured so as to include: a failure detecting unit that detects a failure of the IoT device, wherein the control unit performs control of recovery when the failure detecting unit detects a failure to cause a plurality of applications related to the failed IoT device to migrate to normal computes in a distributed manner in a descending order of priorities of the IoT devices.

According to this configuration, even when a camera fails, a plurality of applications which have become inoperable due to the failure can be recovered by causing the applications to migrate to normal computes in a distributed manner in a descending order of priorities of the cameras. Therefore, even when a camera fails, since analysis processing of photographic information of a camera with a priority corresponding to the failed camera can be performed by applications of the failed camera which have been caused to migrate to normal computes, the photographic information that should have been obtained from the failed camera can be covered.

Furthermore, the specific configurations can be appropriately modified without departing from the scope and spirit of the present invention.

REFERENCE SIGNS LIST

10A IoT device management system
11 to 15 Camera (IoT device)
11A to 15A Application
21 First area
22 Second area
31 to 33 Compute
40 IoT device management apparatus
41 Application control unit
42 Failure detecting unit
44 Locality calculating unit
45 Priority calculating unit
46 First DB
47 Second DB
48 Application generation recovery control unit (control unit)

The invention claimed is:

1. An IoT (Internet of Things) device management apparatus, comprising:
a locality calculating unit, including one or more processors, configured to receive a result of predetermined processing having been performed with respect to acquired information from an IoT device by an application executed by a compute so as to constitute a virtual machine and which, by determining a locality indicating a closeness of arrangement positions of a plurality of IoT devices that is positively correlated with a degree of coincidence among pieces of acquired information from the IoT devices representing received results, calculates locality information that is a result of the determination; and
a control unit, including one or more processors, configured to extract a pair of IoT devices with locality satisfying a threshold from the locality information and perform control for assigning applications related to the extracted pair of IoT devices to different computes.

2. The IoT device management apparatus according to claim 1, comprising:
a priority calculating unit, including one or more processors, configured to calculate priority information representing a prioritization of the plurality of IoT devices by performing processing of ranking the IoT devices in a descending order such that, among pieces of acquired information from the plurality of IoT devices, an IoT device that obtains a largest number of types of acquired information is given a highest priority, an IoT device that obtains a largest number of types of information excluding overlapping data with the highest priority is given a second highest priority, an IoT device that obtains a largest number of types of information excluding overlapping data with the highest priority and the second highest priority is given a third highest priority, and performing the processing in a similar manner with respect to the remaining IoT devices, wherein the control unit is configured to refer to the priority information and perform control to increase an amount of resource allocation with respect to corresponding applications in a descending order of priorities of the IoT devices.

3. The IoT device management apparatus according to claim 1, comprising:
a failure detecting unit including one or more processors, configured to detect a failure of the compute, wherein the control unit is configured to perform control of recovery when the failure detecting unit detects a failure to cause a plurality of applications associated with the failed compute to migrate to normal computes in a distributed manner.

4. The IoT device management apparatus according to claim 2, comprising:
a failure detecting unit including one or more processors, configured to detect a failure of the IoT device, wherein the control unit is configured to perform control of recovery when the failure detecting unit detects a failure to cause a plurality of applications related to the failed IoT device to migrate to normal computes in a distributed manner in a descending order of priorities of the IoT devices.

5. An IoT device management method by an IoT device management apparatus, the IoT device management apparatus executing:
receiving a result of predetermined processing having been performed with respect to acquired information from an IoT device by an application executed by a compute so as to constitute a virtual machine and determining a locality indicating a closeness of arrangement positions of a plurality of IoT devices that is positively correlated with a degree of coincidence among pieces of acquired information from the IoT devices representing received results; and
extracting a pair of IoT devices with locality satisfying a threshold and performing control for assigning applications related to the extracted pair of IoT devices to different computes.

6. The IoT device management method according to claim 5, wherein the IoT device management apparatus executes:
prioritizing the plurality of IoT devices by performing processing of ranking the IoT devices such that, among pieces of acquired information from the plurality of IoT devices, an IoT device that obtains a largest number of types of acquired information is given a highest priority, an IoT device that obtains a largest number of types of information excluding overlapping data with the highest priority is given a second highest priority, an IoT device that obtains a largest number of types of information excluding overlapping data with the highest priority and the second highest priority is given a third highest priority, and performing the processing in a similar manner with respect to the remaining IoT devices; and performing control to increase an amount of resource allocation with respect to corresponding applications in a descending order of priorities of the IoT devices.

7. A non-transitory computer readable medium storing one or more instructions for causing a computer to function as an IoT device management apparatus to execute:

receiving a result of predetermined processing having been performed with respect to acquired information from an IoT device by an application executed by a compute so as to constitute a virtual machine and determining a locality indicating a closeness of arrangement positions of a plurality of IoT devices that is positively correlated with a degree of coincidence among pieces of acquired information from the IoT devices representing received results; and extracting a pair of IoT devices with locality satisfying a threshold and performing control for assigning applications related to the extracted pair of IoT devices to different computes.

8. The IoT device management method according to claim 5, comprising:

detecting a failure of the compute; and performing control of recovery to cause a plurality of applications associated with the failed compute to migrate to normal computes in a distributed manner.

9. The IoT device management method according to claim 6, comprising:

detecting a failure of the IoT device; and performing control of recovery to cause a plurality of applications related to the failed IoT device to migrate to normal computes in a distributed manner in a descending order of priorities of the IoT devices.

10. The non-transitory computer readable medium according to claim 7, wherein the one or more instructions cause the computer to execute:

prioritizing the plurality of IoT devices by performing processing of ranking the IoT devices such that, among pieces of acquired information from the plurality of IoT devices, an IoT device that obtains a largest number of types of acquired information is given a highest priority, an IoT device that obtains a largest number of types of information excluding overlapping data with the highest priority is given a second highest priority, an IoT device that obtains a largest number of types of information excluding overlapping data with the highest priority and the second highest priority is given a third highest priority, and performing the processing in a similar manner with respect to the remaining IoT devices; and performing control to increase an amount of resource allocation with respect to corresponding applications in a descending order of priorities of the IoT devices.

11. The non-transitory computer readable medium according to claim 10, wherein the one or more instructions cause the computer to execute:

detecting a failure of the IoT device; and performing control of recovery to cause a plurality of applications related to the failed IoT device to migrate to normal computes in a distributed manner in a descending order of priorities of the IoT devices.

12. The non-transitory computer readable medium according to claim 7, wherein the one or more instructions cause the computer to execute:

detecting a failure of the compute; and performing control of recovery to cause a plurality of applications associated with the failed compute to migrate to normal computes in a distributed manner.

* * * * *